United States Patent
Tsai et al.

(10) Patent No.: US 10,924,225 B2
(45) Date of Patent: Feb. 16, 2021

(54) GROUP-BASED HYBRID AUTOMATIC REPEAT REQUEST (HARQ) ACKNOWLEDGEMENT FEEDBACK

(71) Applicant: MEDIATEK INC., Hsinchu (TW)

(72) Inventors: Cheng-Rung Tsai, Hsinchu (TW); Chiou-Wei Tsai, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 16/529,534

(22) Filed: Aug. 1, 2019

(65) Prior Publication Data

US 2020/0044791 A1 Feb. 6, 2020

Related U.S. Application Data

(60) Provisional application No. 62/714,147, filed on Aug. 3, 2018, provisional application No. 62/721,632, filed
(Continued)

(51) Int. Cl.
*H04L 1/18* (2006.01)
*H04W 72/04* (2009.01)

(52) U.S. Cl.
CPC .......... *H04L 1/1861* (2013.01); *H04W 72/042* (2013.01); *H04W 72/0413* (2013.01)

(58) Field of Classification Search
CPC .......... H04W 72/1268; H04W 72/1289; H04W 72/1263; H04W 72/0406; H04W 72/0446;
(Continued)

(56) References Cited

U.S. PATENT DOCUMENTS

2010/0031110 A1 2/2010 Seok et al.
2015/0016353 A1* 1/2015 Lee .................. H04L 1/1887
370/329
(Continued)

FOREIGN PATENT DOCUMENTS

CN 107332646 A 11/2017
WO WO 2008/093233 A2 8/2008
(Continued)

OTHER PUBLICATIONS

International Search Report and Written Opinion of the International Searching Authority dated Jan. 6, 2020 in PCT/CN2019/107740, 9 pages.
(Continued)

*Primary Examiner* — Jung Liu
(74) *Attorney, Agent, or Firm* — Oblon, McClelland, Maier & Neustadt, L.L.P.

(57) ABSTRACT

A method can include receiving one or more downlink control informations (DCIs) that are associated with first downlink transmissions belonging to a first hybrid automatic repeat request acknowledgement (HARQ-ACK) feedback group at a user equipment (UE) in a wireless communication system, receiving a first request that indicates a first group index (GI) of the first HARQ-ACK feedback group and a first HARQ-ACK transmission opportunity (TxOP), and transmitting first acknowledge bits for acknowledging receptions of downlink transmissions belonging to the first HARQ-ACK feedback group over the first HARQ-ACK TxOP indicated by the first request.

20 Claims, 9 Drawing Sheets

Related U.S. Application Data on Aug. 23, 2018, provisional application No. 62/737,239, filed on Sep. 27, 2018, provisional application No. 62/753,117, filed on Oct. 31, 2018, provisional application No. 62/770,226, filed on Nov. 21, 2018, provisional application No. 62/828,560, filed on Apr. 3, 2019.

(58) Field of Classification Search
CPC  H04W 72/0453; H04W 72/12; H04L 5/0007; H04L 1/1816; H04L 5/0044; H04L 5/0042; H04L 1/1822; H04L 1/1893; H04L 5/00

See application file for complete search history.

(56) References Cited

U.S. PATENT DOCUMENTS

| | | | |
|---|---|---|---|
| 2015/0103775 A1 | 4/2015 | Zhu et al. | |
| 2016/0043854 A1 | 2/2016 | Damnjanovic et al. | |
| 2016/0182204 A1* | 6/2016 | Hsieh | H04L 1/1893 370/329 |
| 2017/0302493 A1 | 10/2017 | Yang et al. | |
| 2017/0346606 A1* | 11/2017 | Li | H04L 1/1887 |
| 2017/0366305 A1* | 12/2017 | Hwang | H04L 5/001 |
| 2018/0006791 A1 | 1/2018 | Marinier et al. | |
| 2018/0123765 A1* | 5/2018 | Cao | H04L 5/0055 |
| 2018/0132264 A1 | 5/2018 | Jung et al. | |
| 2018/0376490 A1 | 12/2018 | Lunttila et al. | |
| 2019/0097762 A1* | 3/2019 | Jeon | H04W 28/04 |
| 2019/0159251 A1 | 5/2019 | Li et al. | |
| 2019/0181986 A1* | 6/2019 | Kitamura | H04L 1/16 |
| 2019/0230685 A1* | 7/2019 | Park | H04W 72/12 |
| 2019/0230691 A1* | 7/2019 | Cao | H04W 72/1289 |
| 2019/0342037 A1* | 11/2019 | Karaki | H04L 5/0055 |
| 2019/0372720 A1* | 12/2019 | Lee | H04L 1/1812 |

FOREIGN PATENT DOCUMENTS

| | | |
|---|---|---|
| WO | WO 2014/000221 A1 | 1/2014 |
| WO | WO 2014/110826 A1 | 7/2014 |
| WO | WO 2016/123372 A1 | 8/2016 |
| WO | WO 2017/085122 A1 | 5/2017 |
| WO | WO 2017/167308 A1 | 10/2017 |
| WO | WO 2018/085790 A1 | 5/2018 |

OTHER PUBLICATIONS

International Search Report and Written Opinion of the International Searching Authority dated Dec. 27, 2019 in PCT/CN2019/108530, 9 pages.

"On HARQ Feedback Timing" Ericsson, R1-1714439 3GPP TSG-RAN WG1 Meeting #90, Aug. 25, 2017, 2 pages.

"Enhancements to Scheduling and HARQ Operation for NR-U" Qualcomm Incorporated, 3GPP TSG RAN WG1 Meeting #94, 11 R1-1809481, Aug. 24, 2018, 7 pages.

"Enhancements to Scheduling and HARQ Operation for NR-U" Qualcomm Incorporated, 3GPP TSG RAN WG1 Meeting #93, R1-1807391, May 25, 2018, 6 pages.

"Summary of offline discussion on NR-U" Qualcomm Incorporated, 3GPP TSG RAN WG1 Meeting #93, R1-1807815, May 25, 2018, 11 pages.

English translation of the International Search Report and Written Opinion of the International Searching Authority dated Oct. 8, 2019 in PCT/CN2019/099082 filed Aug. 2, 2019, 9 pages.

"Summary of Email Approval [90b-LTE-12] on sPUSCH/sPUCCH Power Control and UL Collision Handling Between Different TTI Lengths" LG Electronics, 3GPP TSG RAN WG1 Meeting #91, R1-1719856, Dec. 1, 2017, 22 pages.

Combined Taiwanese Office Action and Search Report dated Aug. 7, 2020 in corresponding Taiwanese Patent Application No. 108127513 (with English Translation of Category of Cited Documents), 8 pages.

Combined Taiwanese Office Action and Search Report dated May 29, 2020 in corresponding Taiwanese Patent Application No. 108134361 (with English Translation of Category of Cited Documents), 7 pages.

* cited by examiner

GROUP-BASED HYBRID AUTOMATIC REPEAT REQUEST (HARQ) ACKNOWLEDGEMENT FEEDBACK

INCORPORATION BY REFERENCE

This present disclosure claims the benefit of U.S. Provisional Application No. 62/714,147 filed on Aug. 3, 2018, No. 62/721,632 filed on Aug. 23, 2018, No. 62/737,239 filed on Sep. 27, 2018, No. 62/753,117 filed on Oct. 31, 2018, No. 62/770,226 filed on Nov. 21, 2018, No. 62/828,560 filed on Apr. 3, 2019, which are incorporated herein by reference in their entirety.

TECHNICAL FIELD

The present disclosure relates to wireless communications, and specifically relates to data retransmission techniques (e.g., hybrid automatic repeat request (HARQ) related mechanisms).

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Transmission over wireless channels is subject to errors due to variations in the received signal quality. Such variations can be counteracted by employing hybrid automatic repeat request (HARQ). HARQ is a combination of error correcting coding and retransmission of erroneous data units. For example, after detecting an erroneous data unit transmitted from a transmitter, a receiver can request a retransmission from the transmitter by providing a feedback to the transmitter.

SUMMARY

Aspects of the disclosure provide a method. The method can include receiving one or more first downlink control informations (DCIs) that are associated with first downlink transmissions belonging to a first hybrid automatic repeat request acknowledgement (HARQ-ACK) feedback group at a user equipment (UE) in a wireless communication system, receiving a first request that indicates a first group index (GI) of the first HARQ-ACK feedback group and a first HARQ-ACK transmission opportunity (TxOP), and transmitting first acknowledge bits for acknowledging receptions of downlink transmissions belonging to the first HARQ-ACK feedback group over the first HARQ-ACK TxOP indicated by the first request.

In an embodiment, each of the one or more first DCIs indicates the first GI of the first HARQ-ACK feedback group. In an embodiment, each of the first downlink transmissions is a transmission of a physical downlink shared channel (PDSCH) scheduled by the respective DCI or a semi-persistent scheduling (SPS) PDSCH release indicated by the respective DCI. In an embodiment, the first request is one of the first DCIs that are associated with the first downlink transmissions belonging to the first HARQ-ACK feedback group, and indicates a physical uplink control channel (PUCCH) transmission as the first HARQ-ACK TxOP.

In an embodiment, the first request is a DCI scheduling a physical uplink shared channel (PUSCH) transmission as the first HARQ-ACK TxOP. In an embodiment, the first request is a DCI without providing a downlink assignment or an uplink grant, and indicates a PUCCH transmission as the first HARQ-ACK TxOP. In an embodiment, each of the first one or more DCIs carries a counter downlink assignment indicator (C-DAI) value or a total downlink assignment indicator (T-DAI) value or both. The C-DAI value or the T-DAI value is accumulated over PDCCH monitoring occasions for the one or more first DCIs.

In an embodiment, each of the one or more first DCIs carries a new group indicator (NGI) to indicate that the corresponding first downlink transmission belongs to the newest HARQ-ACK feedback group having the first GI.

In an embodiment, the first request includes a trigger field that indicates whether the first request including the trigger field triggers the transmission of the first acknowledge bits for acknowledging receptions of downlink transmissions belonging to the first HARQ-ACK feedback group over the first HARQ-ACK TxOP.

In an embodiment, the method further includes receiving one or more second DCIs that are associated with second downlink transmissions belonging to a second HARQ-ACK feedback group, each of the one or more second DCIs indicating a second GI of the second HARQ-ACK feedback group, receiving a second request indicating the second GI of the second HARQ-ACK feedback group and the first HARQ-ACK TxOP, and transmitting the first acknowledge bits for acknowledging receptions of downlink transmissions belonging to the first HARQ-ACK feedback group and second acknowledge bits for acknowledging receptions of downlink transmissions belonging to the second HARQ-ACK feedback group over the first HARQ-ACK TxOP.

In an embodiment, the transmitting the first acknowledge bits for acknowledging receptions of downlink transmissions belonging to the first HARQ-ACK feedback group and the second acknowledge bits for acknowledging receptions of downlink transmissions belonging to the second HARQ-ACK feedback group over the first HARQ-ACK TxOP includes transmitting a concatenation of the first acknowledge bits and the second acknowledge bits over the first HARQ-ACK TxOP in an increasing or decreasing order of values of the first and second GIs.

Aspects of the disclosure provide another method. The method can include transmitting one or more first DCIs each associated with first downlink transmissions belonging to a first HARQ-ACK feedback group from a base station (BS) in a wireless communication system, transmitting a first request indicating a first GI of the first HARQ-ACK feedback group and a first HARQ-ACK TxOP, and receiving first acknowledge bits for acknowledging receptions of downlink transmissions belonging to the first HARQ-ACK feedback group over the first HARQ-ACK TxOP indicated by the first request.

Aspects of the disclosure provide an apparatus. The apparatus can include processing circuitry configured to receive one or more first downlink control informations (DCIs) that are associated with first downlink transmissions belonging to a first hybrid automatic repeat request acknowledgement (HARQ-ACK) feedback group in a wireless communication system, receive a first request that indicates a first group index (GI) of the first HARQ-ACK feedback group and a first HARQ-ACK transmission opportunity (TxOP), and transmit first acknowledge bits for acknowledging receptions of downlink transmissions belonging to the first HARQ-ACK feedback group over the first HARQ-ACK TxOP indicated by the first request.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
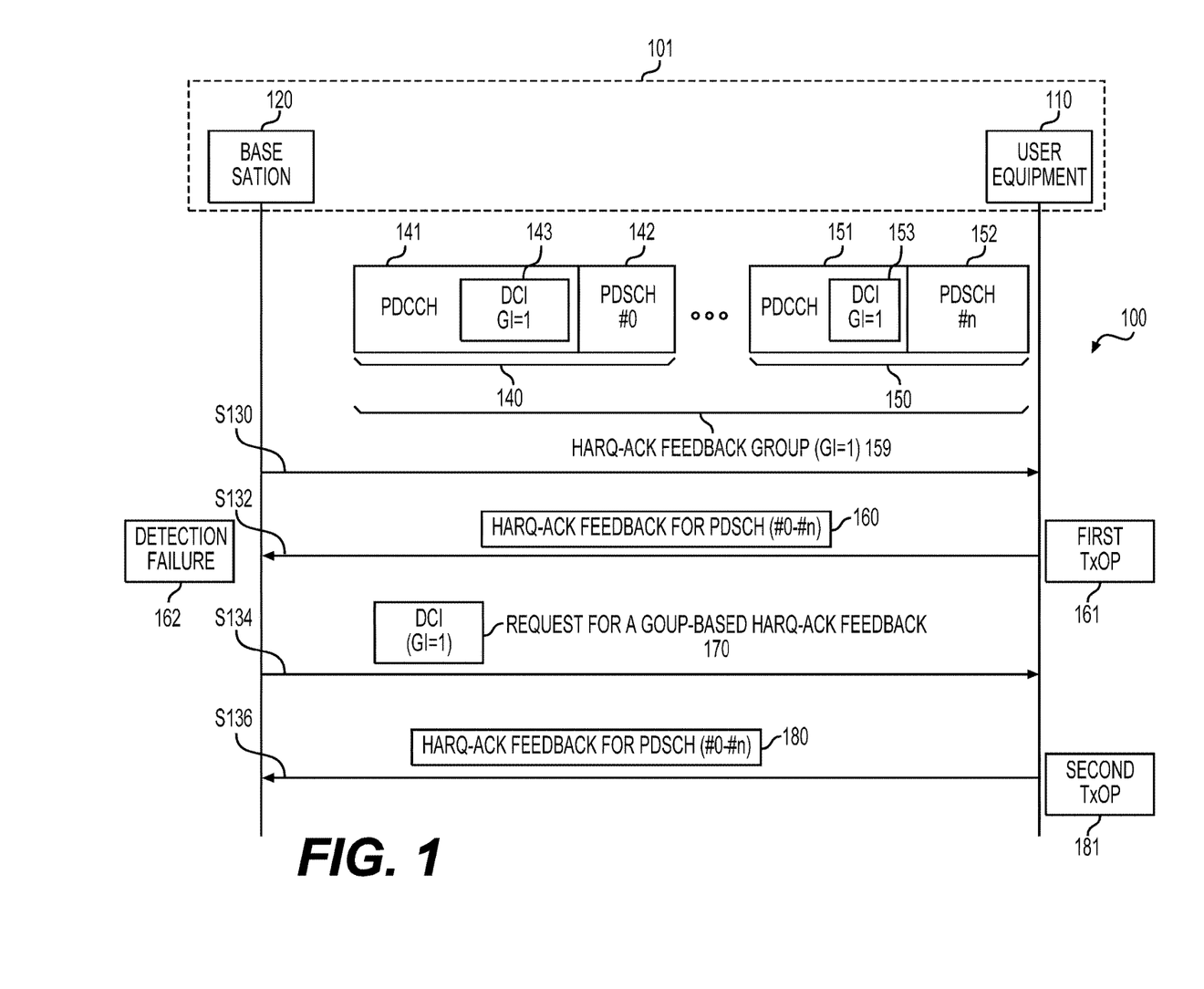
FIG. 1 shows a group-based hybrid automatic repeat request acknowledgement (HARQ-ACK) feedback process 100 according to some embodiments of the disclosure.

FIG. 1 shows a group-based hybrid automatic repeat request acknowledgement (HARQ-ACK) feedback process 100 according to some embodiments of the disclosure. The process 100 can be performed between a user equipment (UE) 110 and a base station (BS) 120 that belong to a wireless communication system 101. In some examples, the system 101 employs the fifth-generation (5G) New Radio (NR) air interface developed by the 3rd Generation Partnership Project (3GPP). In some examples, the system 100 employs other wireless communication technologies developed by various standard development organizations.

In some examples, the BS 120 can be a base station implementing a gNB node as specified in the 5G NR air interface standards developed by 3GPP. In one example, the BS 120 can be configured to control one or more antenna arrays to form directional Tx or Rx beams for transmitting or receiving wireless signals. The UE 110 can be a mobile phone, a laptop computer, a vehicle carried mobile communication device, a utility meter fixed at a certain location, and the like. Similarly, the UE 110 can employ one or more antenna arrays to generate directional Tx or Rx beams for transmitting or receiving wireless signals in one example. Depending on the air interface between the BS 120 and the UE 110, the BS 120 and the UE 110 can communicate with each other according to respective communication protocols.

In the process 100, the BS 120 and the UE 110 employs a HARQ mechanism for data transmission in the downlink or uplink direction. For example, the HARQ mechanism can employ a HARQ entity at a MAC layer of the BS 120. The HARQ entity includes a set of stop-and-wait processes operating in parallel. Each stop-and-wait process can transmit a transport block, and stops and waits for HARQ-acknowledgement (HARQ-ACK) information from the UE 110. The HARQ-ACK information can be a signal bit indicating positive acknowledgement (ACK) or negative acknowledgement (NACK). If a NACK is received, retransmission of the transport block can be performed. At the UE 110, upon receiving the transport block, the UE 110 makes an attempt to decode the transport block, and generate the acknowledgement indicating whether the transport block is correctly decoded or not. Similarly, a HARQ entity can be configured at the UE 110 for implementing the HARQ mechanism for the uplink data retransmission.

In the HARQ mechanism, when the HARQ-ACK feedback is not successful, for example, due to poor channel condition or occupancy of the channel by other UEs, the BS 120 may have to blindly retransmit the transport block even the transport block has been received successfully at the UE 110, or stop trying the transmission even the transport block has not been received. To counteract those undesired results, the process 100 provides a group-based HARQ-ACK feedback mechanism. In the group-based HARQ-ACK feedback mechanism, data transmissions are grouped into a HARQ-ACK feedback group and each associated with a group index (or group indicator) (GI). When detection of a first HARQ-ACK feedback of the members of the HARQ-ACK feedback group is failed, in an example, the BS 120 can signal the GI to the UE 110 and indicate to the UE 110 that acknowledgement of all members of the HARQ-ACK feedback group should be included in a second HARQ-ACK feedback.

The process 100 can start from S130. At S130, a set of downlink transmissions 140-150 can be performed sequentially in time domain. Those downlink transmissions 140-150 can be grouped into a HARQ-ACK feedback group 159, for example, at the HARQ entity of the BS 120. In the FIG. 1 example, the downlink transmissions 140-150 can include a sequence of physical downlink shared channels (PDSCH) 142-152, for example, from PDSCH #0 to PDSCH #n. Each PDSCH 142-152 can be scheduled by a downlink control information (DCI) 143-153 carried in a physical downlink control channel (PDCCH), respectively. To indicate to the UE 110 the downlink transmissions 140-150 are members of the HARQ-ACK feedback group 159, a GI is employed. For example, the HARQ-ACK feedback group 159 can be assigned with a GI (e.g., GI=1), and each DCI 143-153 carries the GI of the HARQ-ACK feedback group 159. While the downlink transmissions 140-150 are shown to be sequentially in time domain in FIG. 1, in other examples, the downlink transmissions 140-150 can be performed in multiple serving cells or bandwidth parts (BWPs) configured for the UE 110. Under such a configuration, several downlink transmissions can be transmitted simultaneously but over different serving cells or BWPs.

At S132, a first HARQ-ACK feedback 160 for receptions of the PDSCHs from #0 to #n is transmitted from the UE 110 to the BS 120. For example, each DCI 143-153 may indicate a same HARQ-ACK transmission opportunity (TxOP), denoted as the first TxOP 161 in FIG. 1. HARQ-ACK bits corresponding to receptions of the PDSCHs from #0 to #n can be included in the HARQ-ACK feedback 160 and transmitted over the first TxOP 161. At the BS 120, a detection failure 162 takes place, and the HARQ-ACK feedback 160 is not received correctly.

At S134, in response to the detection failure of the HARQ-ACK feedback 160, the BS 120 transmits a request 170 for a group-based HARQ-ACK feedback. The request 170 carries the GI of the HARQ-ACK feedback group 159. The request 170 can take various forms in different embodiments. In the FIG. 1 example, the request 170 is a DCI 170 carrying the GI of the HARQ-ACK feedback group 159.

At 5136, a second HARQ-ACK feedback 180 is transmitted from the UE 110 to the BS 120 over a second TxOP 181. In response to the request 170 for the group-based HARQ-ACK feedback, the UE 110 may generate the HARQ-ACK feedback 180 that includes the HARQ-ACK bits corresponding to the receptions of the PDSCHs from #0 to #n. The second TxOP 181 can be indicated by the request 170 (e.g., the DCI 170). After receiving the HARQ-ACK feedback 180, the BS 120 may accordingly determine whether some of the downlink transmissions 140-150 need to be retransmitted, and perform the retransmission if needed. The process 100 can then terminate.

Figure 2:
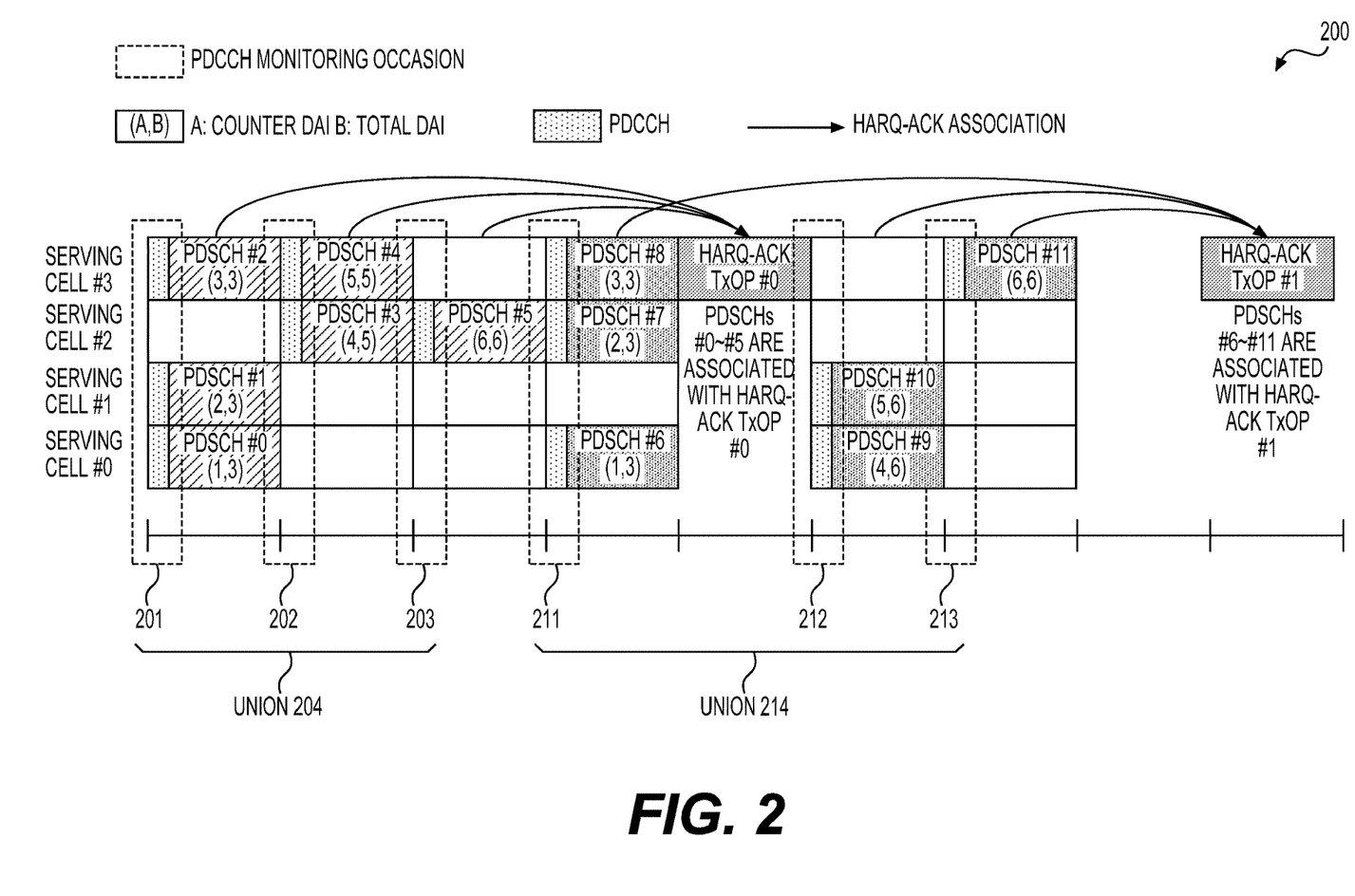
FIG. 2 shows an example of a non-group-based HARQ-ACK feedback mechanism 200.

FIG. 2 shows an example of a non-group-based HARQ-ACK feedback mechanism 200. For example, the mechanism is implemented between the BS 120 and the UE 110. PDCCH monitoring occasions 201-203 and 211-213 are shown across serving cells #0-#3 that are configured for the UE 110, for example, based on a carrier aggregation (CA) scheme. Within each PDCCH monitoring occasion, there can be one or more transmissions of PDCCHs. Those PDCCHs each schedule a PDSCH within a same slot and a same serving cell, such as PDSCH from #0 to #11. For example, each PDCCH can include a DCI scheduling a downlink assignment for reception of the respective PDSCH.

In addition, controlled by the BS 120, the DCI in each PDCCH can indicate a HARQ-ACK TxOP #0 or #1 for the respective PDSCH, and thus associate each PDSCH with one of the TxOPs #0 and #1. In one example, the DCI can carry a PDSCH-to-HARQ-timing-indicator to indicate a slot offset between the PDSCH reception and the corresponding TxOP #0 or #1. Additionally, the DCI can carry a PUCCH resource indicator to indicate a PUCCH resource in the respective TxOP. Based on those indicators, the UE 110 can determine a PUCCH over the TxOP for HARQ-ACK feedback of the PDSCH scheduled by the respective DCI.

When HARQ-ACK information of a PDSCH is to be reported to the BS 120 via a TxOP, it is said the PDSCH is associated with this TxOP. As shown in FIG. 2, the PDSCHs from #0 to #5 are associated with the TxOP #0, while the PDSCHs from #6 to #11 are associated with the TxOP #1. Thus, the PDCCH monitoring occasions 201-203 corresponding to the PDSCHs from #0 to #5 form a first PDCCH monitoring occasion union 204 corresponding to the TxOP #0, while the PDCCH monitoring occasions 211-213 corresponding to the PDSCHs from #6 to #11 form a second PDCCH monitoring occasion union 214 corresponding to TxOP #1. In some examples, the HARQ-ACK information may be one HARQ-ACK bit. In other examples, the HARQ information can be more than one HARQ-ACK bits generated for a PDSCH, e.g., when code block group (CBG) based transmission is applied in NR.

As shown, for each union 204 or 214, multiple PDSCH receptions need to be acknowledged over the TxOP #0 or #1. The UE 110 thus generates a HARQ-ACK codebook for each union 204 or 214, and reports the HARQ-ACK codebooks to the BS 120. For example, for the union 204, the codebook can have a length of 6 bits corresponding to the PDSCH #0-#5, while for the union 214, the codebook can also have a length of 6 bits corresponding to the PDSCH #6-#11. As the association between the PDSCHs and the respective TxOP is determined by the BS 120, the BS 120 and the UE 110 can have a same understanding of the size of each HARQ-ACK codebook if all DCIS scheduling the PDSCHs #0-#11 are detected correctly.

However, in case a DCI (e.g., the DCI scheduling PDSCH #3) is missed by the UE 110, for example, due to poor signal quality, the UE 110 would be unaware of the PDSCH #3. The HARQ-ACK codebook determined at the UE 110 for the union 204 would have a length of 5, resulting misaligned codebooks between the UE 110 and the BS 120. To solve this problem, a downlink assignment index (or downlink assignment indicator) (DAI) field is introduced and included in the DCIS containing the assignment for downlink transmissions (e.g., PDSCHs). The DAI field can include a counter-DAI (C-DAI) value. In case carrier aggregation is employed, the DAI field can include a pair of a C-DAI value and a total-DAI value. Both the C-DAI value and T-DAI value are accumulated over DCIS indicating the same TxOP. In one example, the C-DAI value in the DCI can indicate the accumulative number of {serving cell, PDCCH monitoring occasion}-pairs in which the DCIS indicating the same TxOP are present, up to the current serving cell and current PDCCH monitoring occasion, first in ascending order of serving cell index and then in ascending order of starting time of PDCCH monitoring occasion. The T-DAI value in the DCI can indicate the total number of {serving cell, PDCCH monitoring occasion}-pairs in which the DCIS indicating the same TxOP are present, up to the current PDCCH monitoring occasion and is updated from PDCCH monitoring occasion to PDCCH monitoring occasion.

For example, considering the PDCCH monitoring occasion 202, for the PDCCH scheduling the PDSCH #3, the number of scheduled downlink transmissions is 4 (PDSCH #1 to PDSCH #4) until the serving cell #2, while for the PDCCH scheduling the PDSCH #4, the number of scheduled downlink transmissions is 5 (PDSCH #1 to PDSCH #5) until the serving cell #3. However, at the current time of the PDCCH monitoring occasion 202, there are 5 scheduled downlink transmissions in total. Accordingly, the DCI scheduling the PDSCH #3 carries a DAI field of (4, 5), while the DCI scheduling the PDSCH #4 carries a DAI field of (5, 5).

With the DAI mechanism, the UE 110 can determine a size of the codebook at this point in time by receiving at least one component carrier and detecting the respective T-DAI value. By checking the C-DAI values, the UE 110 can determine which downlink transmission is missed, and feedback a NACK bit corresponding to the missed downlink transmission.

Figure 3:
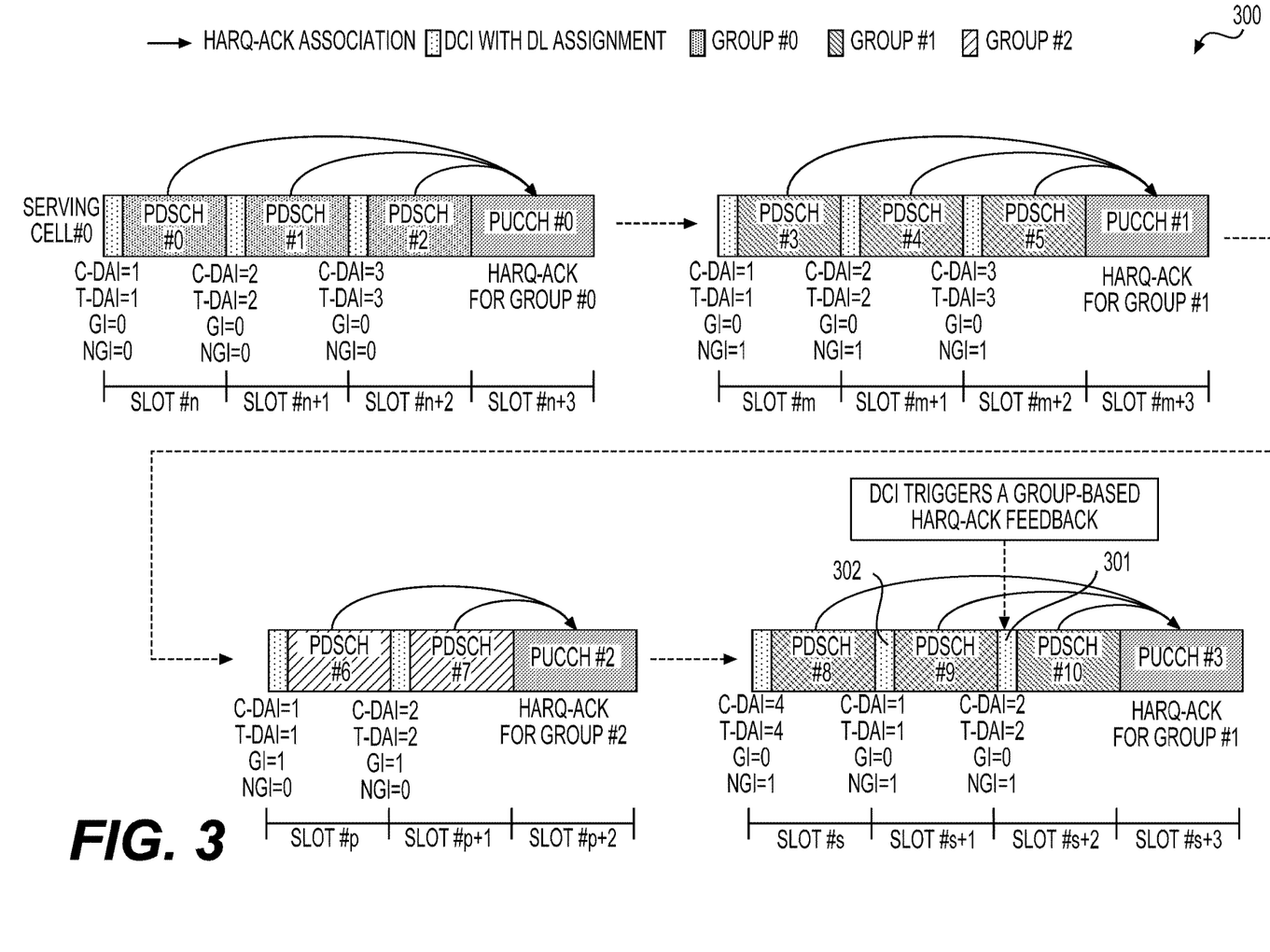
FIG. 3 shows a first group-based HARQ-ACK feedback process 300 according to an embodiment of the disclosure.
Figure 6:
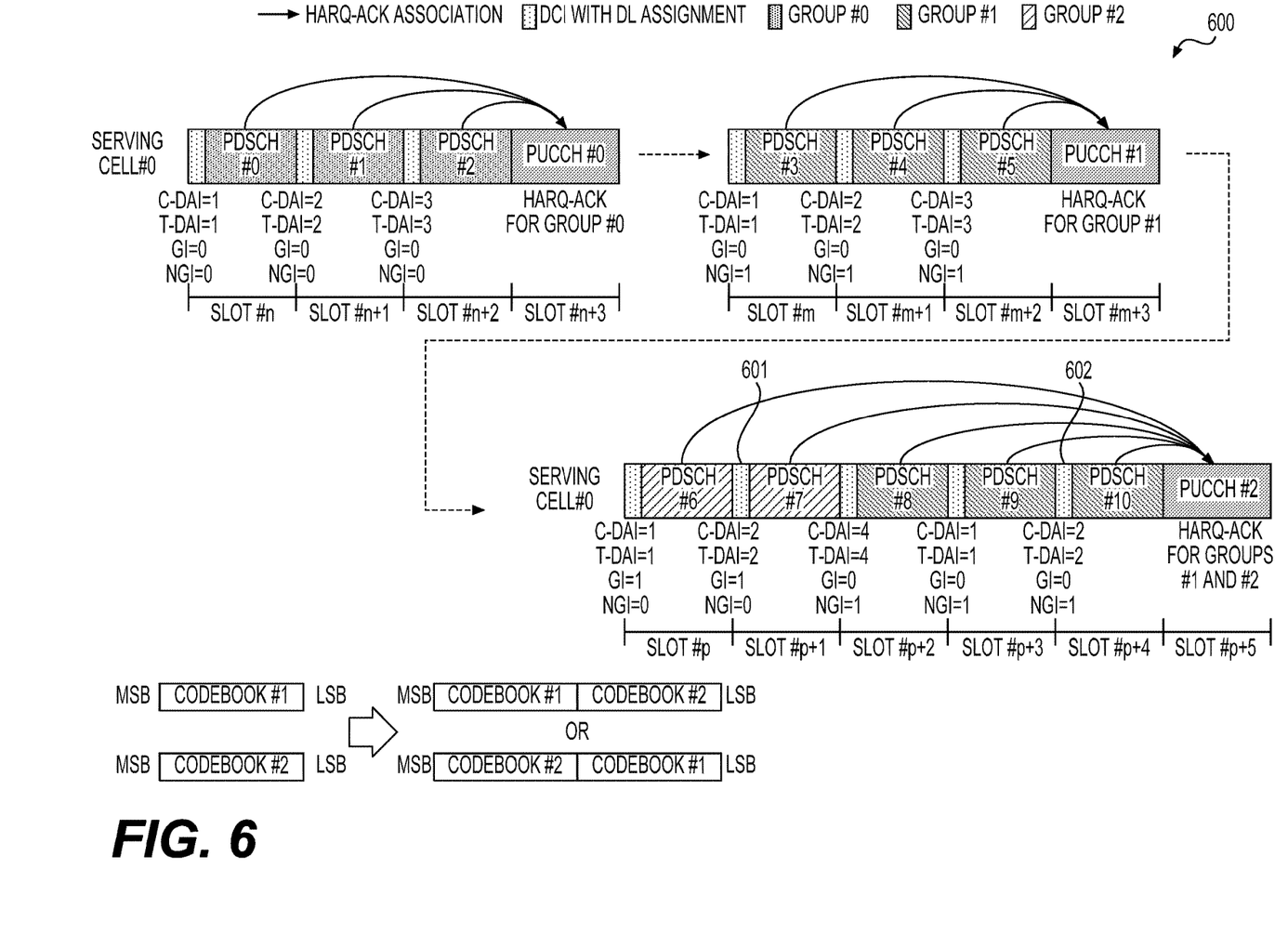
FIG. 6 shows a fourth group-based HARQ-ACK feedback process 600 according to an embodiment of the disclosure.

In the FIG. 2 example, the C-DAI values and T-DAI values are represented with decimal numbers. However, in other examples (e.g., as seen in FIG. 3 and FIG. 6), two bits are used for representing the C-DAI or T-DAI values which wrap around when values are greater than 4. Accordingly, the C-DAI or T-DAI values can be the numbers in FIG. 2 modulo four.

In this disclosure, similarly to the FIG. 2 example, PDSCHs may be shown to be scheduled by PDCCHs transmitted in the same slot and the same serving cell. However, in various examples, a PDSCH scheduled by a PDCCH may be disposed at different slots or different serving cells (e.g., cross scheduling in CA) from the scheduling PDCCH. In addition, multiple PDSCHs may be distributed on BWPs configured over one serving cell.

Further, instead of the DCIS scheduling PDSCHs as shown in FIG. 2, the non-group-based HARQ-ACK feedback scheme 200 can also be applied to a DCI indicating a semi-persistent scheduling (SPS) PDSCH release that can be acknowledged over an associated HARQ-ACK TxOP. Similarly, in the figures described in the disclosure, DCIS scheduling PDSCHs may be shown as examples to illustrate the group-based HARQ-ACK feedback techniques. Those HARQ-ACK feedback techniques described with reference to those figures can also be applied to DCIS indicating SPS PDSCH release.

FIG. 3 shows a first group-based HARQ-ACK feedback process 300 according to an embodiment of the disclosure. The BS 120 and the UE 110 are used as an example to explain the process 300.

A sequence of downlink transmissions of PDSCH from #0 to #10 over a serving cell #0 are shown in FIG. 3. Each PDSCH is scheduled by a respective DCI. Each PDSCH is associated (in terms of HARQ-ACK feedback) with a TxOP (one of PUCCHs from #0 to #3) indicated by the respective DCI. For example, the DCI may carry a PDSCH-to-HARQ-timing-indicator and a PUCCH resource indicator for indicating the respective TxOP.

To facilitate the group-based HARQ-ACK feedback mechanism, the downlink transmissions of PDSCH from #0 to #10 are organized into different HARQ-ACK feedback groups from Group #0 to Group #2 by the BS 120. The PDSCHs #0, #1, and #2 over slots from #n to #n+2 are included in the Group #0. The PDSCHs #3, #4, #5, #8, #9, and #10 over slots from #m to #m+2 and from #s to #s+2 are included in Group #1. The PDSCHs #6 and #7 over slots from #p to #p+1 are included in the Group #2.

The grouping of the downlink transmissions can be based on a group index (GI) carried in each DCI scheduling the downlink transmission. The DCIs scheduling downlink transmissions of a same HARQ-ACK feedback group carry a same GI value. For example, the DCIs of the Group #0 each carry a same GI value of 0. The DCIs of the Group #1 each carry a same GI value of 0. The DCIs of the Group #2 each carry a GI value of 1.

The initialization of a new HARQ-ACK feedback group with a GI value can be based on a new group indicator (NGI) functioning as a toggle bit carried in each DCI scheduling the downlink transmission. For example, Group #0 and Group #1 are transmitted successively and assigned with a same GI value (GI=0). However, at slot #m, which is the starting slot of Group #1, the NGI bit toggled from 0 to 1. In this way, the UE is indicated that a new HARQ-ACK feedback group (i.e., Group #1) with GI=0 is initiated. Separate HARQ-ACK feedback groups (new group and previous group) can be identified even the HARQ-ACK feedback groups have the same GI value.

By control of the GI values and the NGI bits carried in the DCIs, the BS 120 can dynamically form a HARQ-ACK feedback group for purpose of group-based HARQ-ACK feedback. On the other side, by signaling the GI values and the NGI bits carried in the DCIs, the BS 120 can indicate to the UE 110 which downlink transmissions are within a HARQ-ACK feedback group that is to be reported to the BS for a group-based HARQ-ACK feedback.

In addition, as shown in FIG. 3, C-DAI and T-DAI values in the DCIs are accumulated within each HARQ-ACK feedback group. For example, for Group #1, the DCIs scheduling PDSCHs #3, #4, #5, #8, #9, and #10 carry C-DAI or T-DAI values of 1, 2, 3, 4, 1, and 2, respectively.

To facilitate the group-based HARQ-ACK feedback mechanism, the UE 110 can behave in the following way. In response to receiving a DCI that schedules a downlink transmission and carries a GI value of a HARQ-ACK feedback group, the UE 110 can determine to provide a group-based HARQ-ACK feedback for all downlink transmissions belonging to the HARQ-ACK feedback group with the GI value, and transmit the group-based HARQ-ACK feedback over a HARQ-ACK TxOP indicated by the DCI. In this way, each of the DCIs scheduling PDSCHs from #0 to #10 can function as a trigger DCI for a group-based HARQ-ACK feedback from the perspective of the UE 110. However, it is up to the BS 120 to dynamically control how the downlink transmissions are formed into different HARQ-ACK feedback groups.

Particularly, there can be more than one HARQ-ACK feedback groups having a same GI value. In response to receiving the signaling of a GI value in a DCI, the UE 110 can acknowledge the most recent (or the newest) HARQ-ACK feedback group having the GI value.

The group-based HARQ-ACK feedback process 300 can be carried out in the following way. At the beginning, at BS 120, the downlink transmissions, including the PDSCHs #0-#2, are formed into Group #0 with GI=0 carried in the respective DCIs scheduling the PDSCHs #0-#2. The UE 110 receives the downlink transmissions in Group #0 successively, and transmits a HARQ-ACK codebook generated for the receptions of Group #0 over the PUCCH #0. The BS 120 receives the HARQ-ACK codebook over PUCCH #0 correctly.

Next, the BS 120 similarly transmits the downlink transmissions, PDSCHs #3-#5, with GI=0 carried in the respective DCIs scheduling the PDSCHs #3-#5. At current stage, the BS 120 knows the HARQ-ACK feedback of Group #0 has been correctly received previously (which means retransmission of the HARQ-ACK feedback of Group #0 is not needed in the further). Accordingly, the BS 120 can toggle the NGI bit from 0 to 1 at slot #m to indicate a start of Group #1 that has a same GI value as Group #0. The UE 110 receives the downlink transmissions of PDSCHs #3-#5 successively, and transmits a HARQ-ACK codebook generated for the receptions of Group #1 over the PUCCH #1.

However, the HARQ-ACK codebook over PUCCH #1 may not reach the BS 120 successfully. For example, the DCIs scheduling PDSCHs #3-#5 may be missed by the UE 110, and no feedback takes place. Or, the channel for transmitting PUCCH #1 may be occupied by a device in a listen-before-talk (LBT) protocol over an unlicensed spectrum. Or, the BS 120 cannot detect the PUCCH #1 correctly. Accordingly, the BS 120 can determine a retransmission of the ACK/NACK bits for PDSCHs #3-#5 is needed. As a result, signaling a request for the retransmission takes place latter when PDSCHs #8-#10 are transmitted.

Next, the BS 120 similarly transmits the downlink transmissions, PDSCHs #6-#7, with GI=1 carried in the respective DCIs scheduling the PDSCHs #6-#7. At the slot #p, the GI value changed compared with that at slot #m+2, which indicates the PDSCHs #6-#7 belongs to a HARQ-ACK feedback group (Group #2) different from Group #1 formed by PDSCHs #3-#5. The UE 110 may receive the downlink transmissions of Group #2, and transmits a HARQ-ACK codebook for the receptions of Group #2 over the PUCCH #2.

Thereafter, the BS 120 may start to transmit the downlink transmissions PDSCHs #8-#10. At this stage, the BS 120 can determine the DCIs scheduling PDSCHs #8-#10 to carry the same GI values (GI=0) and the same NGI bits (NGI=1) as in DCIs scheduling PDSCHs #3-#5. In this way, the BS 120 can effectively indicate the UE 110 that PDSCHs #3-#5 and PDSCHs #8-#10 belong to the same HARQ-ACK feedback group (Group #1), and a retransmission of ACK/NACK bits of PDSCHs #3-#5 could be performed by generating a group-based HARQ-ACK feedback.

In response to receiving a DCI carrying the GI=0 and indicating the TxOP of PUCCH #3, such as the DCI 301 at slot #s+2 scheduling the PDSCH #10, the UE 110 can determine to provide a group-based HARQ-ACK feedback for all downlink transmissions belonging to the HARQ-ACK feedback group having GI=0, and transmit the group-based HARQ-ACK feedback over the TxOP of PUCCH #3. Particularly, there are more than one HARQ-ACK feedback groups having GI=0 (i.e., Groups #0 and #1). In response to receiving the signaling of GI=0 in the DCI 301, the UE 110 can acknowledge the most recent (or the newest) HARQ-ACK feedback group with GI=0 (i.e., Group #1).

As can be seen, the DCI 301 scheduling the PDSCH #10 and indicating the TxOP of PUCCH #3 functions as a request for a group-based HARQ-ACK feedback. When the BS 120 determines the retransmission of the ACK/NACK bits of PDSCHs #3-#5 are needed, the BS 120 can transmit a DCI scheduling a downlink transmission belonging to the same HARQ-ACK feedback group as PDSCHs #3-#5 (by letting a GI value and an NGI bit in the DCI be the same as that of PDSCHs #3-#5), and this DCI can trigger the UE 110 to provide a group-based HARQ-ACK feedback for all members (including the members of PDSCHs #3-#5) belonging to the HARQ-ACK feedback group.

In an embodiment, if a DCI scheduling a downlink transmission functions as a trigger DCI for a group-based HARQ-ACK feedback as described above, a trigger field can be carried in the DCI to indicate to the UE 110 whether a group-based HARQ-ACK feedback is to be triggered by this DCI. For example, under the control of the BS 120, the DCIs scheduling PDSCHs #0-#10 can each carry a 1-bit trigger field. Using PDSCH #9 as an example, when the trigger field in the DCI 302 scheduling PDSCH #9 is set to 0, for example, the UE 110 can transmit HARQ-ACK information for the reception of PDSCH #9 over the PUCCH #3 indicated by the DCI without considering downlink transmission grouping. In contrast, when the DCI scheduling PDSCH #9 is set to 1, the UE 110 will treat the DCI as a DCI triggering a group-based HARQ-ACK feedback over the PUCCH #3 indicated by the DCI. Accordingly, the UE 110 can generate a group-based feedback based on the grouping information (the GI values and NGI bits) previously received. The group-based feedback can include ACK/NACK bits for the HARQ-ACK feedback group having GI=0 (i.e., Group #1) including PDSCHs #3, #4, #5, #8, and #9.

It is noted that while in FIG. 3 or other figures of the disclosure, downlink transmissions are shown to be transmitted over one serving cell (e.g., serving cell #0), the group-based HARQ-ACK feedback schemes described herein are applicable to scenarios where downlink transmissions (e.g., PDSCH or SPS PDSCH release) are distributed across multiple carriers or BWPs.

Figure 4:
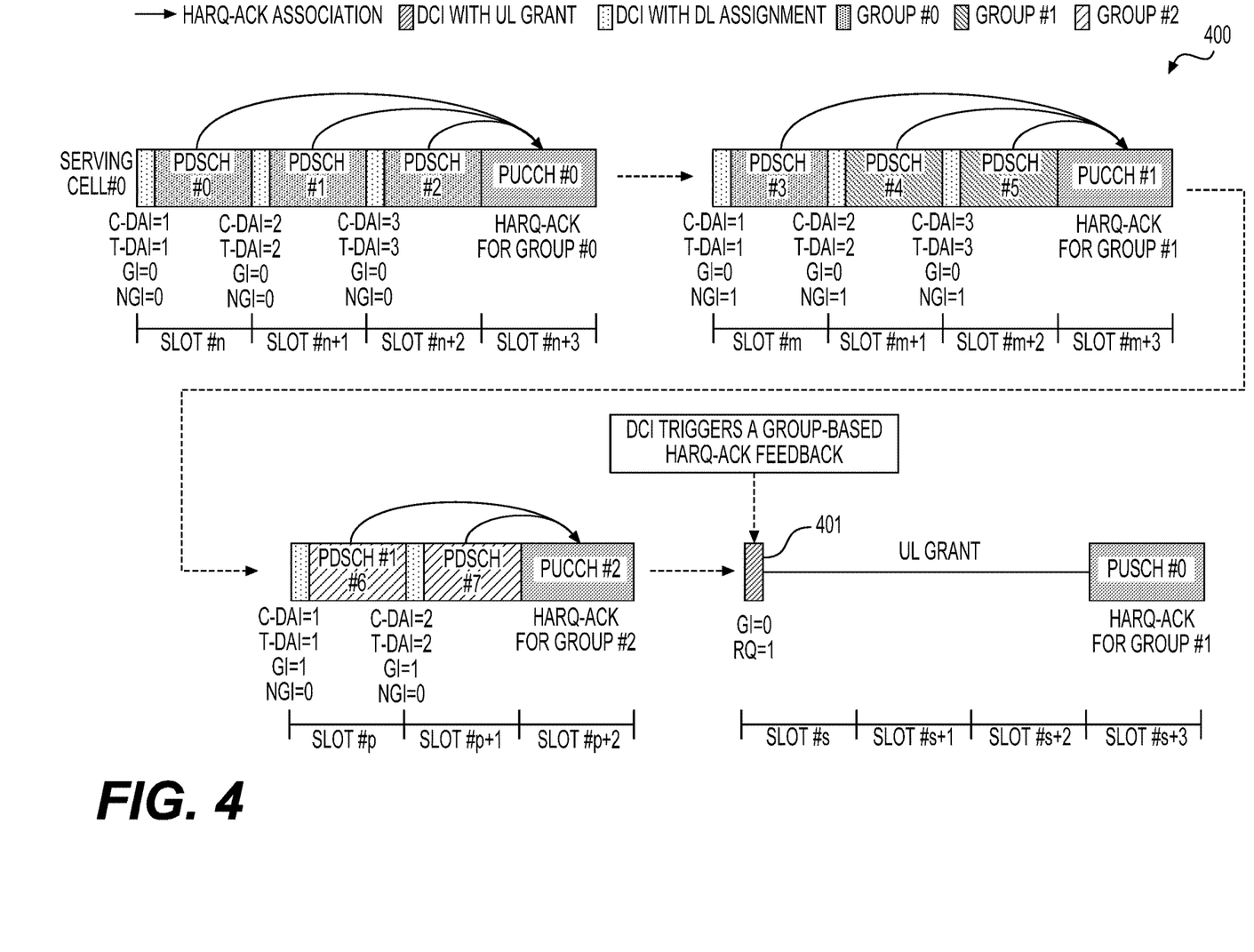
FIG. 4 shows a second group-based HARQ-ACK feedback process 400 according to an embodiment of the disclosure.

FIG. 4 shows a second group-based HARQ-ACK feedback process 400 according to an embodiment of the disclosure. The BS 120 and the UE 110 are used as an example to explain the process 400.

A sequence of PDSCHs from #0 to #7 is transmitted over a serving cell #0 from the BS 120 to the UE 110. Similar to the FIG. 3 example, each PDSCH is scheduled by a respective DCI. Each DCI indicates a PUCCH for feedback of HARQ-ACK information for the reception of the respective PDSCH. As shown, PDSCHs #0-#2 are associated with PUCCH #0. PDSCHs #3-#5 are associated with PUCCH #1. PDSCHs #6-#7 are associated with PUCCH #2.

Similar to the FIG. 3 example, each DCI carries a C-DAI value, a T-DAT value, a GI value, and an NGI bit, which are set by the BS 120. Based on the GI values and NGI bits, the UE 110 can determine PDSCHs #0-#2 are included in a HARQ-ACK feedback group, Group #0, while PDSCHs #3-#5 and PDSCHs #6-#7 are included in HARQ-ACK feedback groups, Group #1 and Group #2, respectively. In addition, the C-DAT and T-DAT values are accumulated over each HARQ-ACK feedback group.

In the process 400, transmissions of the PDSCHs #0-#7 and feedback of respective ACK/NACK bits can be performed in a similar way as in the process 300 of the FIG. 3 example. Particularly, the feedback of ACK/NACK bits over PUCCH #1 for PDSCH #3-#5 can fail, and the BS 120 accordingly determines retransmission of the feedback of ACK/NACK bits for PDSCH #3-#5 is needed.

Then, at slot #s, the BS 120 can transmit a request for a group-based HARQ-ACK feedback that includes the ACK/NACK bits for PDSCH #3-#5. Different from the FIG. 3 example, a DCI 401 scheduling an uplink grant for transmission of a PUSCH #0 is used as the request. In addition, the PUSCH #0 is used as a HARQ-ACK TxOP. Specifically, controlled by the BS 120, the DCI 401 scheduling PUSCH #0 carries the GI value (GI=1) of the Group #1. In one example, the DCI 401 carrying the GI value of the Group #1 can triggers the UE 110 to perform a group-based feedback for all members of the Group #1. For example, a HARQ-ACK codebook can be generated to include the ACK/NACK bits of the receptions of PDSCH #3-#5, and transmitted to the BS 120 over the PUSCH #0. Particularly, there can be more than one HARQ-ACK feedback groups having GI=0 (i.e., Groups #0 and #1). In response to receiving the signaling of GI=0 in the DCI 401, the UE 110 can acknowledge the most recent (or the newest) HARQ-ACK feedback group with GI=0 (i.e., Group #1).

In an alternative example, an additional trigger field (or request field), denoted as RQ in FIG. 4 at slot #s, is carried by the trigger DCI 401 scheduling PUSCH #0. The trigger field, for example, can be a 1-bit field that indicates whether the DCI 401 is intended to be used as a trigger DCI for triggering a group-based HARQ-ACK feedback. For example, when RQ=0, the DCI 401 is not a trigger DCI, while when RQ=1, the DCI 401 is treated as a DCI triggering a group-based HARQ-ACK feedback.

Figure 5:
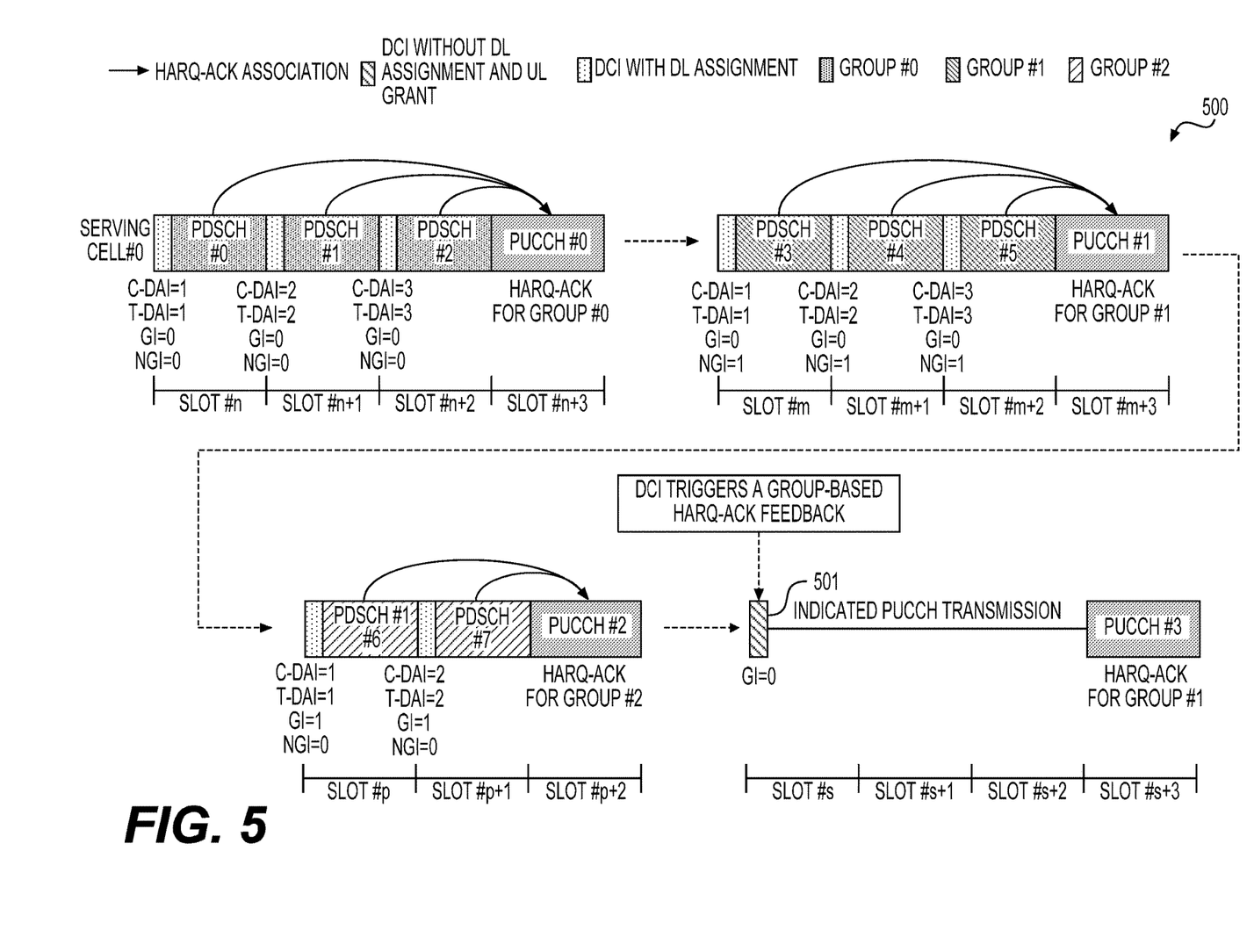
FIG. 5 shows a third group-based HARQ-ACK feedback process 500 according to an embodiment of the disclosure.

FIG. 5 shows a third group-based HARQ-ACK feedback process 500 according to an embodiment of the disclosure. The BS 120 and the UE 110 are used as an example to explain the process 500.

As shown, downlink transmissions of PDSCHs and associated DCIs and uplink ACK/NACK feedback operations until slot #p+2 in the process 500 can be similar to the operations until slot #p+2 in the process 300 or 400. However, different from the process 300 or 400, a DCI 501 without downlink assignment or uplink grant can be used as a trigger DCI for triggering a group-based HARQ-ACK feedback. The DCI 501 can carry sufficient information for indicating a HARQ-ACK TxOP to the UE 110. The TxOP can be a PUCCH #3 as shown in FIG. 5. In one example, similar to the usage of the PDSCH-to-HARQ-timing-indicator to indicate a time slot, and a PUCCH resource indicator to indicate a PUCCH resource, a set of indicators can be employed to indicate uplink transmission resources. In other examples, other mechanisms for indicating uplink transmission resources may be used.

Similarly, the DCI 501 may carry a GI value indicating which group is to be acknowledged, or may carry a GI value and a trigger field (RQ) which in combination can trigger the group-based HARQ-ACK feedback.

FIG. 6 shows a fourth group-based HARQ-ACK feedback process 600 according to an embodiment of the disclosure. The BS 120 and the UE 110 are used as an example to explain the process 600.

In FIG. 6, a sequence of PDSCHs #0-#10 is transmitted over a serving #0. Controlled by DCIs scheduling PDSCHs #0-#10, HARQ-ACK feedbacks of PDSCHs #0-#10 are associated with HARQ-ACK TxOPs, PUCCH #0, #1, and #2, respectively. Each DCI carries a C-DAI value, a T-DAI value, a GI value, and a NGI bit. The GI values and NGI bits indicate how the PDSCHs #0-#10 are organized into HARQ-ACK feedback groups, Group #0, #1, or #2. Specifically, PDSCHs #0-#2, PDSCHs #3-#5 and #8-#10, and PDSCHs #6-#7 are included in Group #0, #1, or #2, respectively.

Different from the previous examples of FIGS. 3-5, in FIG. 6, two HARQ-ACK feedback groups, Groups #1 and #2, are associated with the same TxOP, PUCCH #2. For example, the DCI 601 scheduling PDSCH #7 carries the GI value of Group #2, and indicates the TxOP of PUCCH #2, while similarly, the DCI 602 scheduling PDSCH #10 carries the GI value of Group #1, and also indicates the TxOP of PUCCH #2. In response to receiving the trigger DCIs 601 and 602, the UE 110 can transmit a group-based HARQ-ACK feedback for both Groups #1 and #2 over the PUCCH #2.

In one example, as shown in FIG. 6, two HARQ-ACK codebooks, Codebooks #1 and #2, can be generated corresponding to Groups #1 and #2. Then, the two codebooks are combined together, for example, by concatenating one codebook with another codebook in increasing or decreasing order of corresponding GI values of Groups #1 and #2.

In other examples, signaling of associating more than one HARQ-ACK feedback group with a same TxOP can be performed using trigger DCIs similar to the trigger DCIs 401 or 501 in the FIG. 4 or FIG. 5 examples. For example, the trigger DCI 401 or 501 can be set to include two GI values corresponding to two HARQ-ACK feedback groups. For another example, more than one trigger DCIs similar to the DCI 401 or 501 can be transmitted. Those DCIs can indicate a same TxOP but carry different GI values.

Figure 7:
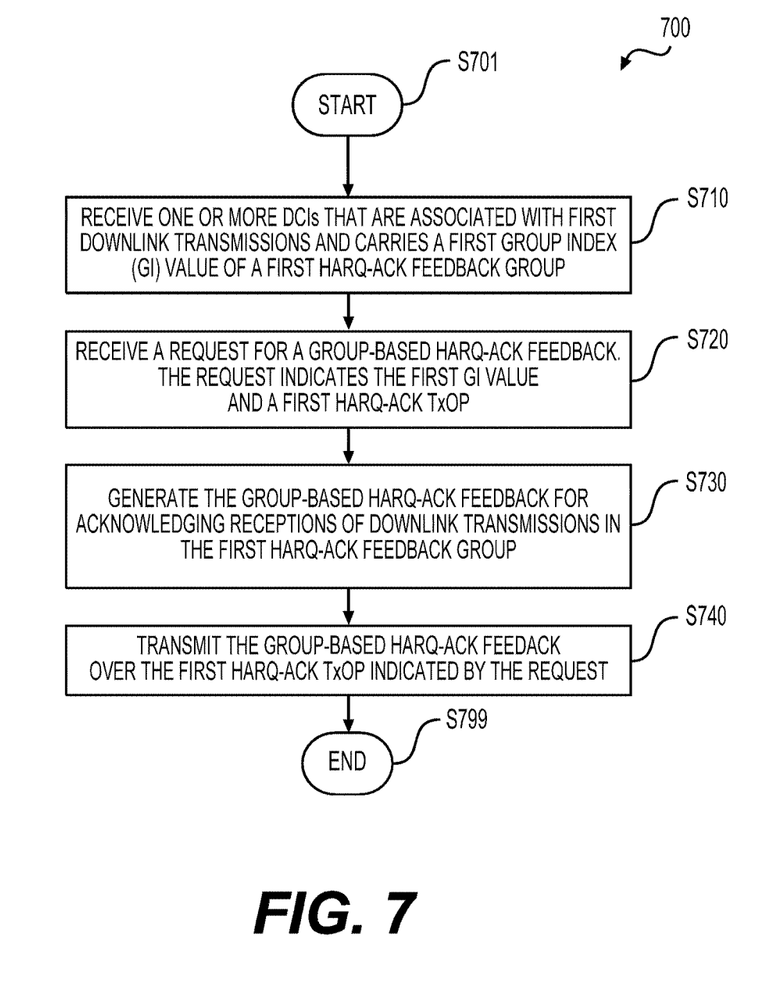
FIG. 7 shows a process 700 of a group-based HARQ feedback mechanism according to an embodiment of the disclosure.

FIG. 7 shows a process 700 of the group-based HARQ feedback mechanism according to an embodiment of the disclosure. The process 700 can be performed at the UE 110. The BS 120 and the UE 110 are used as an example to explain the process 700. The process 700 starts from S701 and proceeds to S710.

At S710, one or more DCIs can be received at the UE 110. Each DCI can be associated with a first downlink transmission, for example, of a PDSCH or a SPS PDSCH release. Each DCI can carry a first GI value of a first HARQ-ACK feedback group.

At S720, a request for a group-based HARQ-ACK feedback can be received by the UE 110. The request can indicate the first GI value of the first HARQ-ACK feedback group and a first HARQ-ACK TxOP.

In one example, each DCI received at S710 can further indicate a HARQ-ACK TxOP that is different from the first HARQ-ACK TxOP indicated in the request received at S720. In response to receiving the first downlink transmission(s), the UE 110 may generate and transmit a HARQ-ACK feedback over the HARQ-ACK TxOP indicated by the DCI(s). However, the BS 120 failed to detect the HARQ-ACK feedback over the HARQ-ACK TxOP indicated by the DCIs at S710. Accordingly, the BS 120 can transmit the request for a group-based HARQ-ACK feedback at S720. In another example, each DCI received at S710 can further indicate a HARQ-ACK TxOP that is the same as the first HARQ-ACK TxOP indicated in the request received at S720.

At S730, the UE 110 can generate the group-based HARQ-ACK feedback for acknowledging receptions of downlink transmissions in the first HARQ-ACK feedback group in response to receiving the request at S720. The first downlink transmissions are members of the first HARQ-ACK feedback group. Accordingly, the group-base HARQ-ACK feedback includes HARQ-ACK information bits (ACK/NACK bits) of the first transmissions.

At S740, the group-based HARQ-ACK feedback is transmitted over the first HARQ-ACK TxOP indicated by the request. The process 700 proceeds to S799 and terminates at S799.

Figure 8:
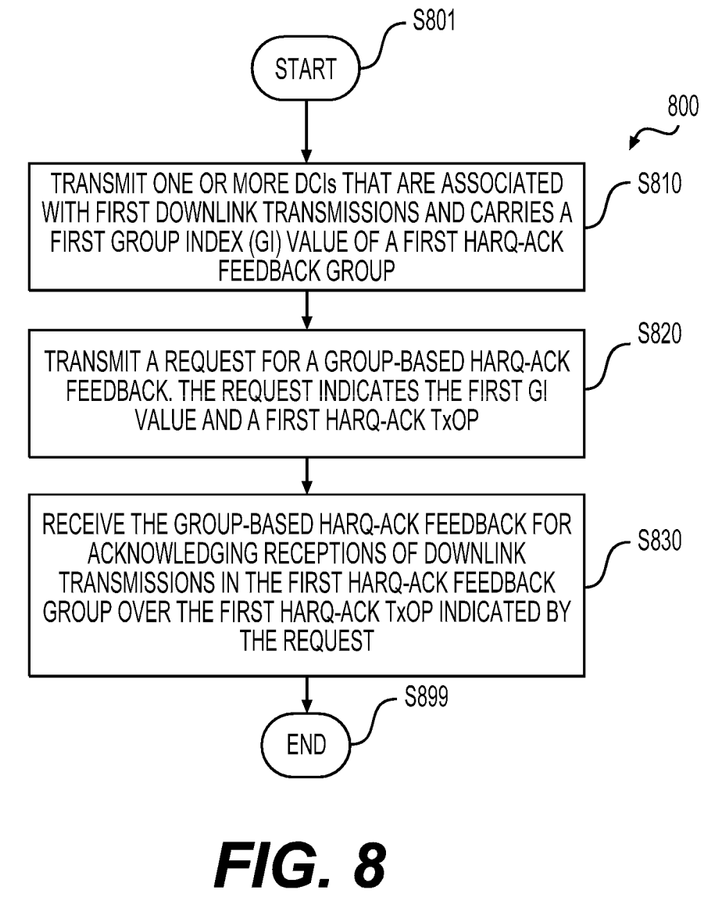
FIG. 8 shows another process 800 of the group-based HARQ feedback mechanism according to an embodiment of the disclosure.

FIG. 8 shows a process 800 of the group-based HARQ feedback mechanism according to an embodiment of the disclosure. The process 800 can be performed at the BS 120. The BS 120 and the UE 110 are used as an example to explain the process 800. The process 800 starts from S801 and proceeds to S810.

At S810, one or more DCIs can be transmitted from the BS 120. Each DCI can be associated with a first downlink transmission. Each DCI can carry a first GI value of a first HARQ-ACK feedback group.

At S820, a request for a group-based HARQ-ACK feedback can be transmitted from the BS 120. The request can indicate the first GI value of the first HARQ-ACK feedback group and a first HARQ-ACK TxOP.

At S830, the group-based HARQ-ACK feedback for acknowledging receptions of downlink transmissions in the first HARQ-ACK feedback group can be received over the first HARQ-ACK TxOP indicated by the request. The group-based HARQ-ACK feedback can include HARQ-ACK information bits of the first downlink transmissions transmitted at S810. The process 800 can proceeds to S899, and terminates at S899.

In a first example, each DCI transmitted at S810 can further indicate a HARQ-ACK TxOP that is different from the first HARQ-ACK TxOP indicated in the request transmitted at S820. In response to receiving the first downlink transmission(s), the UE 110 may generate and transmit a HARQ-ACK feedback over the HARQ-ACK TxOP. Then, a detection of the HARQ-ACK feedback for the first downlink transmission(s) transmitted over the HARQ-ACK TxOP can be performed at the BS 120. However, the signal quality may be poor. Or, due to channel occupancy by a device in a LBT protocol on an unlicensed spectrum, the HARQ-ACK feedback is not transmitted. Because of the above or other reasons, the BS 120 may fail to correctly detect the HARQ-ACK feedback. Accordingly, the BS 120 can determine to have a retransmission of HARQ-ACK information bits of the first downlink transmissions by transmitting the request for a group-based HARQ-ACK feedback at S820.

In a second example, each DCI transmitted at S810 can further indicate a HARQ-ACK TxOP that is the same as the first HARQ-ACK TxOP indicated in the request transmitted at S820.

For either the first or the second example, in response to receiving the request at S820, the UE 110 can generate the group-based HARQ-ACK feedback. Based on the GI values carried in DCIs transmitted at S810, the UE 110 can determine that the first downlink transmissions belong to the first HARQ-ACK feedback group. Thus, the UE 110 can generate the HARQ-ACK information bits of the first downlink transmissions for the group-based HARQ-ACK feedback.

Figure 9:
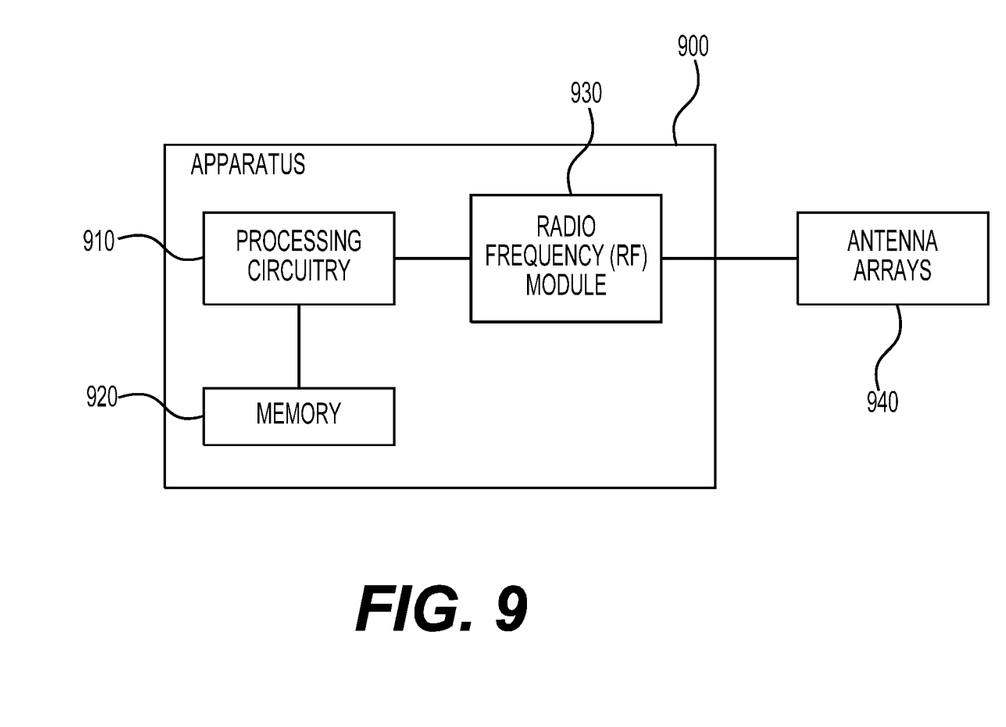
FIG. 9 shows an exemplary apparatus 900 according to embodiments of the disclosure.

FIG. 9 shows an exemplary apparatus 900 according to embodiments of the disclosure. The apparatus 900 can be configured to perform various functions in accordance with one or more embodiments or examples described herein. Thus, the apparatus 900 can provide means for implementation of mechanisms, techniques, processes, functions, components, systems described herein. For example, the apparatus 900 can be used to implement functions of the UE 110 or the BS 120 in various embodiments and examples described herein. The apparatus 900 can include a general purpose processor or specially designed circuits to implement various functions, components, or processes described herein in various embodiments. The apparatus 900 can include processing circuitry 910, a memory 920, and a radio frequency (RF) module 930.

In various examples, the processing circuitry 910 can include circuitry configured to perform the functions and processes described herein in combination with software or without software. In various examples, the processing circuitry 910 can be a digital signal processor (DSP), an application specific integrated circuit (ASIC), programmable logic devices (PLDs), field programmable gate arrays (FPGAs), digitally enhanced circuits, or comparable device or a combination thereof.

In some other examples, the processing circuitry 910 can be a central processing unit (CPU) configured to execute program instructions to perform various functions and processes described herein. Accordingly, the memory 920 can be configured to store program instructions. The processing circuitry 910, when executing the program instructions, can perform the functions and processes. The memory 920 can further store other programs or data, such as operating systems, application programs, and the like. The memory 920 can include non-transitory storage media, such as a read only memory (ROM), a random access memory (RAM), a flash memory, a solid state memory, a hard disk drive, an optical disk drive, and the like.

In an embodiment, the RF module 930 receives a processed data signal from the processing circuitry 910 and converts the data signal to beamforming wireless signals that are then transmitted via antenna arrays 940, or vice versa. The RF module 930 can include a digital to analog convertor (DAC), an analog to digital converter (ADC), a frequency up convertor, a frequency down converter, filters and amplifiers for reception and transmission operations. The RF module 930 can include multi-antenna circuitry for beamforming operations. For example, the multi-antenna circuitry can include an uplink spatial filter circuit, and a downlink spatial filter circuit for shifting analog signal phases or scaling analog signal amplitudes. The antenna arrays 940 can include one or more antenna arrays.

The apparatus 900 can optionally include other components, such as input and output devices, additional or signal processing circuitry, and the like. Accordingly, the apparatus 900 may be capable of performing other additional functions, such as executing application programs, and processing alternative communication protocols.

The processes and functions described herein can be implemented as a computer program which, when executed by one or more processors, can cause the one or more processors to perform the respective processes and functions. The computer program may be stored or distributed on a suitable medium, such as an optical storage medium or a solid-state medium supplied together with, or as part of, other hardware. The computer program may also be distributed in other forms, such as via the Internet or other wired or wireless telecommunication systems. For example, the computer program can be obtained and loaded into an apparatus, including obtaining the computer program through physical medium or distributed system, including, for example, from a server connected to the Internet.

The computer program may be accessible from a computer-readable medium providing program instructions for use by or in connection with a computer or any instruction execution system. The computer readable medium may include any apparatus that stores, communicates, propagates, or transports the computer program for use by or in connection with an instruction execution system, apparatus, or device. The computer-readable medium can be magnetic, optical, electronic, electromagnetic, infrared, or semiconductor system (or apparatus or device) or a propagation medium. The computer-readable medium may include a computer-readable non-transitory storage medium such as a semiconductor or solid state memory, magnetic tape, a removable computer diskette, a random access memory (RAM), a read-only memory (ROM), a magnetic disk and an optical disk, and the like. The computer-readable non-transitory storage medium can include all types of computer readable medium, including magnetic storage medium, optical storage medium, flash medium, and solid state storage medium.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method, comprising:
receiving, by a user equipment (UE) in a wireless communication system, one or more first downlink control informations (DCIs) that are associated with first downlink transmissions belonging to a first hybrid automatic repeat request acknowledgement (HARQ-ACK) feedback group in a wireless communication system;
receiving, by the UE from a base station, a first request that indicates a first group index (GI) of the first HARQ-ACK feedback group and a first HARQ-ACK transmission opportunity (TxOP); and
transmitting, by the UE to the base station, first acknowledge bits for acknowledging receptions of downlink transmissions belonging to the first HARQ-ACK feedback group over the first HARQ-ACK TxOP indicated by the first request.

2. The method of claim 1, wherein each of the one or more first DCIs indicates the first GI of the first HARQ-ACK feedback group.

3. The method of claim 1, wherein each of the first downlink transmissions is a transmission of a physical downlink shared channel (PDSCH) scheduled by the respective DCI or a semi-persistent scheduling (SPS) PDSCH release indicated by the respective DCI.

4. The method of claim 1, wherein the first request is one of the first DCIs that are associated with the first downlink transmissions belonging to the first HARQ-ACK feedback group, and indicates a physical uplink control channel (PUCCH) transmission as the first HARQ-ACK TxOP.

5. The method of claim 1, wherein the first request is a DCI scheduling a physical uplink shared channel (PUSCH) transmission as the first HARQ-ACK TxOP.

6. The method of claim 1, wherein the first request is a DCI without providing a downlink assignment or an uplink grant, and indicates a PUCCH transmission as the first HARQ-ACK TxOP.

7. The method of claim 1, wherein each of the one or more first DCIs carries a counter downlink assignment indicator (C-DAI) value or a total downlink assignment indicator (T-DAI) value or both,
wherein the C-DAI value or the T-DAI value is accumulated over PDCCH monitoring occasions for the one or more first DCIs.

8. The method of claim 1, wherein each of the one or more first DCIs carries a new group indicator (NGI) to indicate that the corresponding first downlink transmission belongs to the newest HARQ-ACK feedback group having the first GI.

9. The method of claim 1, wherein the first request includes a trigger field that indicates whether the first request including the trigger field triggers the transmission of the first acknowledge bits for acknowledging receptions of downlink transmissions belonging to the first HARQ-ACK feedback group over the first HARQ-ACK TxOP.

10. The method of claim 1, further comprising:
receiving one or more second DCIs that are associated with second downlink transmissions belonging to a second HARQ-ACK feedback group, each of the one or more second DCIs indicating a second GI of the second HARQ-ACK feedback group;
receiving a second request indicating the second GI of the second HARQ-ACK feedback group and the first HARQ-ACK TxOP; and
transmitting the first acknowledge bits for acknowledging receptions of downlink transmissions belonging to the first HARQ-ACK feedback group and second acknowledge bits for acknowledging receptions of downlink transmissions belonging to the second HARQ-ACK feedback group over the first HARQ-ACK TxOP.

11. The method of claim 10, wherein the transmitting the first acknowledge bits for acknowledging receptions of downlink transmissions belonging to the first HARQ-ACK feedback group and the second acknowledge bits for acknowledging receptions of downlink transmissions belonging to the second HARQ-ACK feedback group over the first HARQ-ACK TxOP includes:
transmitting a concatenation of the first acknowledge bits and the second acknowledge bits over the first HARQ-ACK TxOP in an increasing or decreasing order of values of the respective first and second GIs.

12. A method, comprising:
transmitting, by a base station (BS) in a wireless communication system, one or more first downlink control informations (DCIs) each associated with first downlink transmissions belonging to a first hybrid automatic repeat request acknowledgement (HARQ-ACK) feedback group in a wireless communication system;
transmitting, by the BS to a user equipment (UE), a first request indicating a first group index (GI) of the first HARQ-ACK feedback group and a first HARQ-ACK TxOP; and receiving, by the BS from the UE, first acknowledge bits for acknowledging receptions of downlink transmissions belonging to the first HARQ-ACK feedback group, the first acknowledge bits being transmitted by the UE and over the first HARQ-ACK TxOP indicated by the first request.

13. The method of claim 12, further comprising:
performing a detection of a HARQ-ACK feedback for the first downlink transmissions; and
when the detection of the HARQ-ACK feedback is failed, transmitting the first request.

14. The method of claim 12, wherein each of the one or more first DCIs indicates the first GI of the first HARQ-ACK feedback group.

15. The method of claim 12, wherein each of the first downlink transmissions is a transmission of a physical downlink shared channel (PDSCH) scheduled by the respective DCI or a semi-persistent scheduling (SPS) PDSCH release indicated by the respective DCI.

16. The method of claim 12, wherein the first request is one of the first DCIs that are associated with the first downlink transmissions belonging to the first HARQ-ACK feedback group, and indicates a physical uplink control channel (PUCCH) transmission as the first HARQ-ACK TxOP.

17. The method of claim 12, wherein the first request is a DCI scheduling a physical uplink shared channel (PUSCH) transmission as the first HARQ-ACK TxOP.

18. The method of claim 12, wherein the first request is a DCI without providing a downlink assignment or an uplink grant, and indicates a PUCCH transmission as the first HARQ-ACK TxOP.

19. The method of claim 12, wherein the one or more first DCIs each carries a counter downlink assignment indicator (C-DAI) value or a total downlink assignment indicator (T-DAI) value or both,
wherein the C-DAI value or the T-DAI value is accumulated over PDCCH monitoring occasions for the one or more first DCIs.

20. An apparatus, comprising processing circuitry configured to:
receive one or more first downlink control informations (DCIs) that are associated with first downlink transmissions belonging to a first hybrid automatic repeat request acknowledgement (HARQ-ACK) feedback group in a wireless communication system;
receive, from a base station, a first request that indicates a first group index (GI) of the first HARQ-ACK feedback group and a first HARQ-ACK transmission opportunity (TxOP); and
transmit, to the base station, first acknowledge bits for acknowledging receptions of downlink transmissions belonging to the first HARQ-ACK feedback group over the first HARQ-ACK TxOP indicated by the first request.

* * * * *